United States Patent
Seack et al.

(10) Patent No.: US 9,447,530 B2
(45) Date of Patent: Sep. 20, 2016

(54) METHOD FOR PRODUCING A COMPONENT FOR CONNECTING STRUCTURES AND DEVICE

(71) Applicants: Oliver Seack, Bremen (DE); Alexander Bruns, Bremen (DE)

(72) Inventors: Oliver Seack, Bremen (DE); Alexander Bruns, Bremen (DE)

(73) Assignee: Airbus Operations GmbH, Hamburg (DE)

( * ) Notice: Subject to any disclaimer, the term of this patent is extended or adjusted under 35 U.S.C. 154(b) by 537 days.

(21) Appl. No.: 13/649,226

(22) Filed: Oct. 11, 2012

(65) Prior Publication Data

US 2013/0091675 A1   Apr. 18, 2013

Related U.S. Application Data

(60) Provisional application No. 61/552,732, filed on Oct. 28, 2011.

(30) Foreign Application Priority Data

Oct. 13, 2011   (DE) .................... 10 2011 084 438

(51) Int. Cl.
*D04H 1/00* (2006.01)
*D03D 25/00* (2006.01)
(Continued)

(52) U.S. Cl.
CPC ................. *D04H 1/00* (2013.01); *B29C 70/14* (2013.01); *B29C 70/205* (2013.01); (Continued)

(58) Field of Classification Search
CPC ...... B23P 11/00; B29C 70/14; B29C 70/205; B29C 70/222; B29C 70/24; B29C 70/76; B64C 1/26; B64C 5/08; B64C 9/00; B64C 2009/005; B64C 9/02; B64C 27/615; D03D 1/00; D03D 3/00; D03D 13/00; D03D 13/004; D03D 25/005; D04H 1/00; D04H 5/00; D10B 2505/02; D10B 2505/12; Y10T 29/49801; Y10T 29/49622; Y10T 29/49947
See application file for complete search history.

(56) References Cited

U.S. PATENT DOCUMENTS

| 661,346 A | 11/1900 | Lincoln |
|---|---|---|
| 1,843,170 A | 2/1932 | Meldrim |

(Continued)

FOREIGN PATENT DOCUMENTS

| DE | 2757965 | 6/1979 |
|---|---|---|
| DE | 3546267 | 8/1986 |

(Continued)

OTHER PUBLICATIONS

Notice of Allowance for U.S. Appl. No. 13/649,203 dated Mar. 4, 2014.

(Continued)

*Primary Examiner* — Christopher Besler
*Assistant Examiner* — Matthew P Travers
(74) *Attorney, Agent, or Firm* — Jenkins, Wilson, Taylor & Hunt, P.A.

(57) ABSTRACT

The present invention pertains inter alia to a method for producing a component for connecting structures at crossing regions thereof, having the following steps: depositing first and second fibers on an underlay in such a way that a respective first fiber has an offset in the longitudinal direction of the first or second fiber with respect to a respective second fiber; connecting the first and second fiber along an overlap region, in which the first and second fibers overlap; and pivoting the first and second fibers with respect to one another to form the component.

10 Claims, 6 Drawing Sheets

(51) Int. Cl.
*D03D 3/00* (2006.01)
*D03D 1/00* (2006.01)
*B29C 70/24* (2006.01)
*B29C 70/14* (2006.01)
*B29C 70/76* (2006.01)
*B29C 70/20* (2006.01)
*B29C 70/22* (2006.01)
*B64C 1/26* (2006.01)
*B64C 9/02* (2006.01)

(52) U.S. Cl.
CPC ............ *B29C 70/222* (2013.01); *B29C 70/24* (2013.01); *B29C 70/76* (2013.01); *D03D 1/00* (2013.01); *D03D 3/00* (2013.01); *D03D 25/005* (2013.01); *B64C 1/26* (2013.01); *B64C 9/02* (2013.01); *D10B 2505/02* (2013.01); *D10B 2505/12* (2013.01); *Y02T 50/433* (2013.01); *Y10T 29/49622* (2015.01); *Y10T 29/49801* (2015.01)

(56) References Cited

U.S. PATENT DOCUMENTS

| | | | |
|---|---|---|---|
| 3,818,951 A | | 6/1974 | Greenwood |
| RE28,672 E | | 1/1976 | Wakeman |
| 4,122,871 A | * | 10/1978 | McGinley ..................... 139/460 |
| 4,201,815 A | | 5/1980 | Weiland et al. |
| 4,382,712 A | | 5/1983 | Buchs |
| 4,395,450 A | | 7/1983 | Whitener |
| 4,584,226 A | | 4/1986 | Vitale et al. |
| 4,622,254 A | | 11/1986 | Nishimura et al. |
| 4,671,470 A | | 6/1987 | Jonas |
| 4,686,134 A | | 8/1987 | Ono |
| 4,715,560 A | | 12/1987 | Loyek |
| 4,725,485 A | | 2/1988 | Hirokawa |
| 5,024,874 A | | 6/1991 | Yasui |
| 5,463,794 A | | 11/1995 | Erland |
| 5,945,053 A | | 8/1999 | Hettinga |
| 6,481,911 B1 | | 11/2002 | Streuber |
| 7,198,691 B2 | | 4/2007 | Ludin et al. |
| 7,425,103 B2 | | 9/2008 | Perez-Sanchez |
| 7,451,950 B2 | | 11/2008 | Perez-Sanchez |
| 7,521,108 B2 | | 4/2009 | Franklin et al. |
| 7,582,345 B2 | | 9/2009 | Priegelmeir et al. |
| 7,900,878 B2 | | 3/2011 | Perez-Sanchez |
| 8,220,744 B2 | | 7/2012 | Benthien |
| 8,322,656 B2 | | 12/2012 | Pahl |
| 8,328,134 B2 | | 12/2012 | Wagner |
| 8,642,151 B2 | | 2/2014 | Goering et al. |
| 8,833,697 B2 | | 9/2014 | Seack et al. |
| 8,967,541 B2 | | 3/2015 | Seack et al. |
| 2005/0175399 A1 | | 8/2005 | Perez-Sanchez |
| 2008/0173761 A1 | | 7/2008 | Benthien |
| 2009/0149100 A1 | | 6/2009 | Goering |
| 2010/0090062 A1 | | 4/2010 | Wagner |
| 2010/0148008 A1 | | 6/2010 | Hernando Sebastian et al. |
| 2011/0143085 A1 | | 6/2011 | Blot et al. |
| 2013/0092794 A1 | | 4/2013 | Seack |
| 2013/0094898 A1 | | 4/2013 | Seack |
| 2013/0099062 A1 | | 4/2013 | Seack |

FOREIGN PATENT DOCUMENTS

| | | |
|---|---|---|
| DE | 195 27 197 A1 | 1/1997 |
| DE | 102006035576 | 12/2007 |
| DE | 10 2009024789 | 12/2010 |
| DE | 102009043103 | 3/2011 |
| DE | 102007011613 | 7/2011 |
| DE | 10 2011 08447 | 1/2013 |
| EP | 1 145 841 | 10/2001 |
| EP | 1 595 787 | 11/2005 |
| EP | 1627726 | 2/2006 |
| FR | 2 412 782 | 7/1979 |
| WO | WO 2009/064594 | 5/2009 |
| WO | WO 2011/035860 | 3/2011 |

OTHER PUBLICATIONS

German Office Action for Serial No. 10 2011 084 433.3 dated Jun. 26, 2012.
German Office Action for Serial No. 10 2011 084 441.4 dated May 24, 2012.
German Office Action for Serial No. 10 2011 084 472.4 dated Jun. 26, 2012.
German Office Action for Serial No. 10 2011 084 438.4 dated May 23, 2012.
Partial European Search Report for Application No. 12188066.0 dated Jan. 23, 2013.
European Search Report for Application No. 12188064.5 dated Feb. 13, 2013.
European Search Report for Application No. 12188066.0 dated Apr. 26, 2013.
Non-Final Office Action for U.S. Appl. No. 13/649,218 dated Apr. 17, 2014.
Notice of Allowance for U.S. Appl. No. 13/649,203 dated May 13, 2014.
Notice of Allowance for U.S. Appl. No. 13/649,218 dated Aug. 14, 2014.
European Search Report for Application No. 12188224 dated Mar. 12, 2014.
Notice of Allowance for U.S. Appl. No. 13/649,218 dated Oct. 29, 2014.
Corrected Notice of Allowance for U.S. Appl. No. 13/649,218 dated Nov. 17, 2014.
Restriction Requirement for U.S. Appl. No. 13/649,213 dated Dec. 10, 2014.
Extended European Search Report for Application No. 12188065.2 dated Apr. 25, 2013.
Non-Final Office Action for U.S. Appl. No. 13/649,213 dated Mar. 12, 2015.
European Office Action for Application No. 12 188 065.2 dated Apr. 23, 2015.
Ogale, A. Tailoring of Textile Preforms for Fibre-reinforced Polymer Composites, Journal of Industrial Textiles, Oct. 2004, vol. 34, No. 2, 77-96.
"Pivot, v.". OED Online. Jun. 2015. Oxford University Press. http://www.oed.com/view/Entry/144827?rskey=v1 Gu1 Q&result=2&isAdvanced=false (accessed Sep. 3, 2015).
"Swivel, v.1 ". OED Online. Jun. 2015. Oxford University Press. http://www.oed.com/view/Entry/195996?rskey=NtscjO&result=2&isAdvanced=false (accessed Sep. 3, 2015).
Final Office Action for U.S. Appl. No. 13/649,213 dated Sep. 10, 2015.
Advisory Action for U.S. Appl. No. 13/649,213 dated Nov. 19, 2015.
Non-Final Office Action for U.S. Appl. No. 13/649,213 dated Feb. 24, 2016.
European Office Action for 12 188224.5 dated Mar. 4, 2016.

* cited by examiner

METHOD FOR PRODUCING A COMPONENT FOR CONNECTING STRUCTURES AND DEVICE

CROSS-REFERENCE TO RELATED APPLICATIONS

This application claims the benefit of and priority to U.S. Provisional Application No. 61/552,732, filed on Oct. 28, 2011, and of German patent application No. 10 2011 084 438.4, filed Oct. 13, 2011, the entire disclosures of which are incorporated herein by reference.

FIELD OF THE INVENTION

The present invention relates to a method for producing a component for connecting structures, a method for producing a structural arrangement and a device for producing a component.

Figure 1:
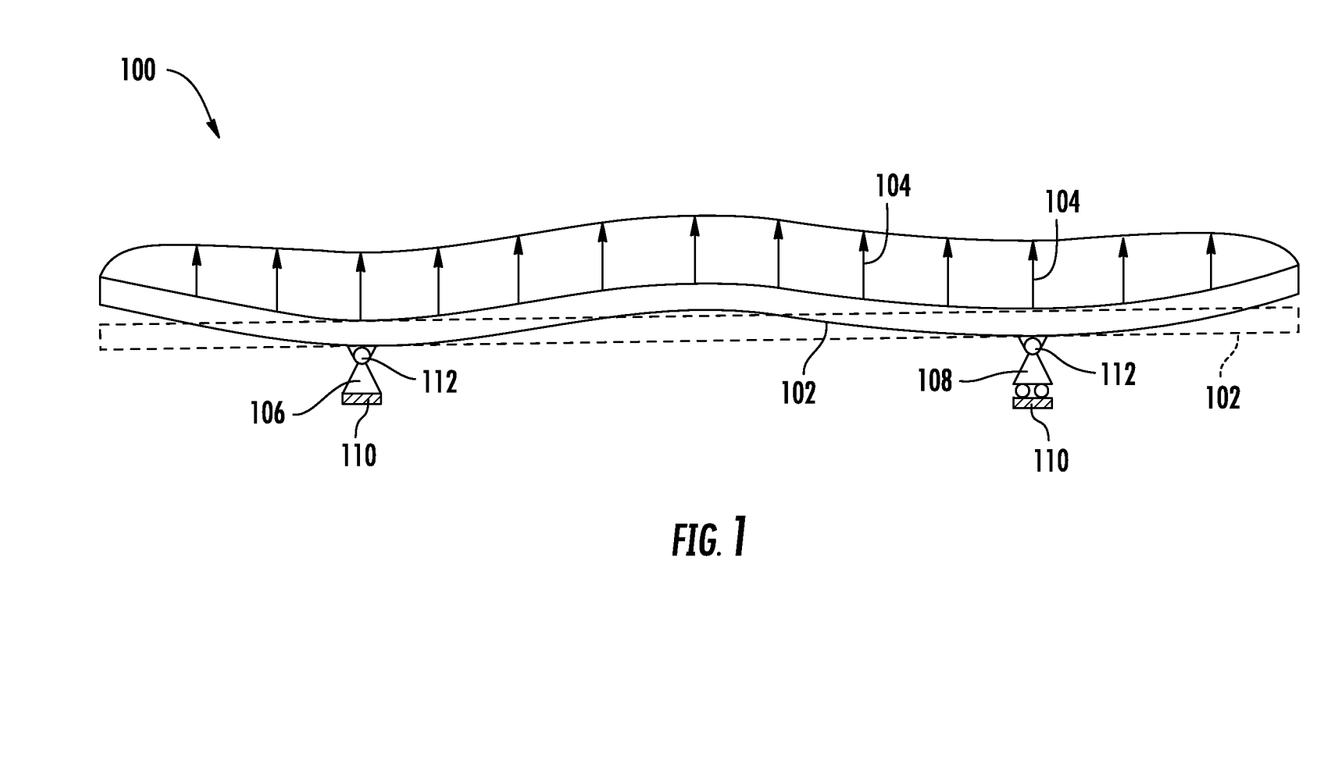
FIG. 1 shows a detail of an aircraft.

FIG. 1 shows a detail from an aircraft designated 100 in general. The aircraft 100 comprises a landing flap 102. FIG. 1 shows the landing flap 102 counter to the flight direction of the aircraft 100. The landing flap 102 is shown once in a dashed view, which corresponds to its unloaded state. The landing flap 102 is furthermore shown by a continuous line, which corresponds to its state shown greatly exaggerated and deformed because of air loads 104. The landing flap 102 is connected by means of two flap carriages 106, 108 to a wing 110, which is only schematically indicated. The flap carriages 106, 108 allow an adjustment of the landing flap 102 with respect to the wing 110 from a flight position into a take-off or landing position, the take-off and landing position serving to increase the lift. In the wingspan direction, in other words from left to right in FIG. 1, one flap carriage 106 is configured as a fixed bearing and the other flap carriage 108 as a loose bearing. The flap carriages 106, 108 are in each case connected by an eye-pin connection 112 to the landing flap 102.

It is known to configure the eye of a respective eye-pin connection 112 in the form of a fitting, which is manufactured from metal and is connected, in particular riveted, to the landing flap 102. For example, DE 10 2007 011 613 A1 shows a fitting made of metal for load introduction.

There is increasingly a need to also produce load introduction elements, such as, for example, the above-described eye of the eye-pin connection 112, from fibre composite materials, for example carbon fibre plastics material (CFRP), in order to save further weight and assembly costs. US 2010/0148008 A1 describes a corresponding load introduction element made of fibre composite material, which is produced by an RTM (resin transfer moulding) method.

SUMMARY OF THE INVENTION

An idea of the present invention is to disclose a method for simple production of a component, in particular the load introduction element described above, a method for simple production of a structural arrangement and a device for simple production of the component.

Accordingly, a method is provided for producing a component for connecting structures at crossing regions thereof, having the following steps: depositing first and second fibres on an underlay, in such a way that a respective first fibre has an offset in the longitudinal direction of the first or second fibre with respect to a respective second fibre, connecting the first and second fibre along an overlap region, in which the first and second fibres overlap, and pivoting the first and second fibres with respect to one another to form the component.

Furthermore, a method is provided for producing a structural arrangement, in particular for an aircraft or spacecraft, having the following steps: providing a first structure, providing a second structure, which forms a crossing region with the first structure, producing a component by the method according to the invention and connecting the first and second structure in the crossing region by means of the component.

Furthermore, a device is provided for producing a component for connecting structures at crossing regions thereof, in particular for carrying out the method according to the invention, with an underlay, a depositing mechanism to deposit the first and second fibres on the underlay, in that a respective first fibre has an offset in the longitudinal direction of the first or second fibre with respect to a respective second fibre, a connecting mechanism to connect the first and second fibres along an overlap region, in which the first and second fibres overlap, and a pivoting mechanism for pivoting the first and second fibres with respect to one another to form the component.

The idea on which the present invention is based on the finding that a component with an approximately cruciform cross-section can easily be produced, in which the first and second fibres are pivoted relative to one another. After the pivoting, the first fibres intersect with the second fibres at a crossing point. The first fibres then extend, for example, substantially horizontally through the crossing point and the second fibres extend, for example, substantially perpendicularly. If the component thus provided is integrated in a structural arrangement, in particular in the landing flap described at the outset, the latter can provide two substantially mutually independent load paths through the crossing point: the first load path leads along the first fibres and the second load path leads along the second fibres.

The use of the methods and the device is not restricted to the field of air or space travel. For example, these may also be used in the area of producing bridges, multi-storey buildings, masts, roofs or other planar supporting structures.

"Fibre" preferably comprises both a single fibre and a fibre tow of individual fibres.

Advantageous configurations of the invention emerge from the subordinate claims.

The first and second fibres are preferably deposited parallel to one another on the underlay. If, in the present case, "parallel" is referred to, deviations from this of up to 30 degrees, preferably up to 10 degrees, still more preferably up to 2 degrees, are also meant.

According to a preferred configuration of the method according to the invention, it is provided that the first fibres are connected to one another in a first projection region, in which they project in the longitudinal direction over the second fibres, and/or the second fibres are connected to one another in a second projection region, in which they project in the longitudinal direction over the first fibres. This produces a stable structure of first fibres, which can be pivoted against a second structure made of second fibres.

According to a preferred configuration of the method according to the invention, it is provided that the first and second fibres are connected to one another in the overlap region along a centre line, which is arranged centrally in relation to a total extent of the first and second fibres in the longitudinal direction, and/or the first fibres are connected to one another in the first projection region along a first line parallel to the centre line and/or the second fibres are connected to one another along a second line parallel to the centre line and opposing the first line in relation to the centre line. This type of fastening of the fibres can be produced easily, in particular in an automated manner, because it is substantially linear.

According to a preferred configuration of the method according to the invention, it is provided that the first and second fibres are connected to one another in the overlap region, the first fibres are connected to one another in the first projection region and/or the second fibres are connected to one another in the second projection region by means of stitching, weaving, braiding or gluing. The stitching, weaving, braiding and gluing can easily be automated.

According to a preferred configuration of the method according to the invention, it is provided that at least one stitching, weaving or braiding fibre is fed through a gap in the underlay. For example, a lower fibre ("bottom thread") can thus easily be fed.

According to a preferred configuration of the method according to the invention, it is provided that the gluing takes place by means of a thermoplastic strand, a fibre sheathed at least in portions with a thermoplastic material, or an adhesive strip. The thermoplastic strand, the fibre and the adhesive strip may, for example, be easily laid along the first or second line and/or the centre line in order to thereby glue them to the first and/or second fibre.

According to a preferred configuration of the method according to the invention, it is provided that the first and second fibres are pivoted with respect to one another in such a way that the latter have an angle of 30 to 90 degrees, preferably 60 to 90 degrees, more preferably 80 to 90 degrees, still more preferably 90 degrees, with respect to one another, and/or the pivoting of the first and second fibres with respect to one another is brought about by means of a curved guide element, past which the first and/or second fibres are guided. As a result, the component can easily be produced with a cruciform cross-section.

According to a preferred configuration of the method according to the invention, it is provided that the underlay is configured as a conveyor belt, on which the first and second fibres are deposited. By means of the conveyor belt, the first and second fibres can move past the connecting mechanism in an automated manner, so an efficient method is ensured.

According to a preferred configuration of the method according to the invention, it is provided that the first and second fibres are in each case cut to length from continuous material before the depositing. As a result, the efficiency of the method can also be increased.

According to a preferred configuration of the device according to the invention, it is provided that the underlay has a plurality of parts, which, between them, define at least one gap, through which at least one stitching, weaving or braiding fibre can be fed to connect the first and/or the second fibre.

According to a preferred configuration of the device according to the invention, it is provided that the connecting mechanism is set up to connect the first fibres to one another in a first projection region, in which they project in the longitudinal direction over the second fibres, and/or to connect the second fibres to one another in a second projection region, in which they project in the longitudinal direction over the first fibres. For this purpose, the connecting mechanism may be guided, in particular, by a robot hand.

According to a preferred configuration of the device according to the invention, it is provided that the connecting mechanism comprises at least one stitching needle, by means of which the first fibres, second fibres and/or the first and second fibres can be stitched to one another.

According to a preferred configuration of the device according to the invention, it is provided that the pivoting mechanism has a curved guide path to guide the first and/or second fibre past and to pivot them. The guide path is, in particular, configured as a guide rail.

BRIEF DESCRIPTION OF THE DRAWINGS

The invention will be described in more detail below on the basis of embodiments with reference to the accompanying figures of the drawings, in which.

Identical reference numerals in the figures denote identical or functionally identical components, unless indicated otherwise.

DETAILED DESCRIPTION OF THE INVENTION

Figure 2:
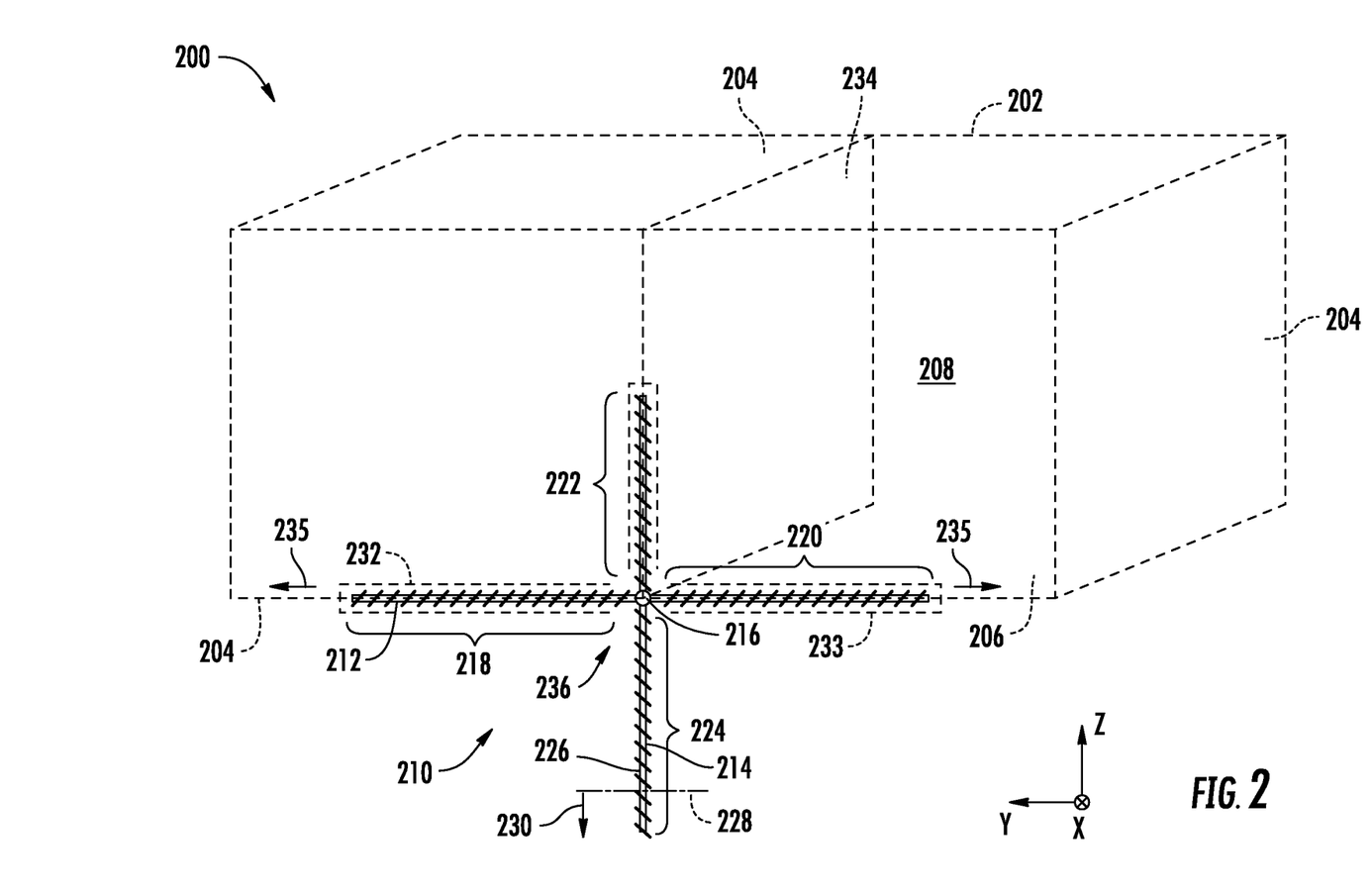
FIG. 2 shows a schematic view of a structural arrangement comprising a component.

FIG. 2 shows a partially perspective view of a structural arrangement 200 according to an embodiment kept comparatively general.

The structural arrangement 200 is, for example, a component of the landing flap 102 shown in FIG. 1 and therefore a component of the aircraft 100. Basically, the structural arrangement 200 may, however, be a component of any flap or aerofoil wing.

In the present case, the three spatial directions that are orthogonal to one another are designated X, Y and Z. This serves merely for better understanding of the spatial arrangement of the various components with respect to one another. In the case of the landing flap 102, X designates the oncoming flow direction, Y the wingspan direction and Z the vertical direction.

The structural arrangement 200 comprises a substantially closed box structure 202 indicated by dashed lines in FIG. 2. By "substantially closed" it is meant that the box structure 202 has no or only comparatively small apertures in its outer walls 204. The front outer wall 206 is shown as transparent in FIG. 2 to reveal the view of the interior 208 of the box structure 202. The outer walls 204, 206, according to one embodiment, form the outer skin of the landing flap 102.

The structural arrangement 200 furthermore comprises a component 210, which is composed of first and second fibres 212, 214, wherein, for the sake of better understanding, only one such individual first fibre 212 and an individual second such fibre 214 are shown in the YZ-plane. The component 210 may comprise any desired number of such fibres 212 and 214 arranged next to one another in the X-direction. The first and second fibres 212, 214 are designated by short dashes in opposing directions to distinguish them better. A respective first fibre 212 extends, for example, in a horizontal XY-plane, while a respective second fibre 214 extends, for example, in a vertical XZ-plane. A respective first fibre 212 and a respective second fibre 214 therefore extend, according to the embodiment, perpendicular to one another.

A respective first fibre 212 and a respective second fibre 214 are connected to one another at a crossing point 216. The fibres 212, 214 are stitched, woven, braided or glued to one another at the crossing point 216. It is furthermore shown in FIG. 2 that a respective first fibre 212 has a first and second portion 218, 220, the portions 218, 220 being connected to the lower outer wall 204, which extends in the XY-plane, of the box structure 202. Stated more precisely, the first portion 218 of the first fibre 212 is integrated in a first portion 232 of the outer wall 204 and the second portion 220 of the first fibre 212 is integrated in a second portion 233 of the outer wall 204, in particular glued in. For this purpose, the portions 232, 233 of the outer wall 204 are in each case fork-shaped. However, a different type of fastening of the portions 218, 220 on or in the outer wall 204 of the box structure 202 is also conceivable.

A respective second fibre 214 forms an inner web 222, which projects upwardly into the interior 208 of the box structure 202, and an outer web 224, which extends downwardly outside the box structure 202. The inner web 222 is connected to a support element 234 of the structural arrangement 200. The support element 234 is, for example, configured as a rib, which is connected to the box structure 202. The support element 234 may, for example, also be configured as a beam or transverse web. The inner web 222 is preferably integrated in the support element 234, in particular glued in.

The outer web 224 has a fastening point 226 to introduce a first load 230 into the outer web 224. The fastening point 226 is, in particular, configured as an eye, but may also be configured as a different structural load transmission device, such as, for example, a riveting or gluing. A corresponding axis of the eye 226 is designated by the reference numeral 228.

The second fibre 214 guides the first load 230 introduced at the fastening point 226 from the fastening point 226 into the support element 234. The first fibre 212 simultaneously transmits the second load 235 between the first and second portions 232, 233 of the box structure 202. Therefore, two substantially mutually independent load paths are provided. For example, bending loads 235 in the outer wall 204 are guided by means of the first fibres 212 through the crossing point 216, while—substantially unaffected thereby—the holding forces 230 introduced at the eye 226 by means of the flap carriage 106, 108 are guided into the support element 234. Despite the fibre composite mode of construction, the eye 226 is therefore effectively prevented from peeling off in the coupling region 216 by the uninterrupted first and second fibres 212, 214.

The outer wall 204, with the rib 234, forms a crossing region 236, in which the component 210 is preferably glued. The gluing of the portions 218, 220 of the component 210 in the outer wall 204 of the box structure 202 may take place in different ways: the completely or partially cured portions 218, 220 can be cured with the wet outer wall 204. Furthermore, the completely or partially cured portions 218, 220 can be structurally glued to the completely or partially cured outer wall 204. Furthermore, the dry portions 218, 220 can be infiltrated together with the dry outer wall 204 and cured. Furthermore, the wet portions 218, 220 (prepregs) can be glued to the wet outer wall 204 (prepreg).

Furthermore, the inner web 222 of the component 210 is preferably also glued into the rib 234 (or a beam or transverse web) in one of the ways as described above for the portions 218, 220. The outer web 226 can also be glued into a rib, not shown.

Other possibilities of connecting the component 210 to the outer wall 204 and rib 234 are conceivable, for example bolting or screwing.

Figure 3:
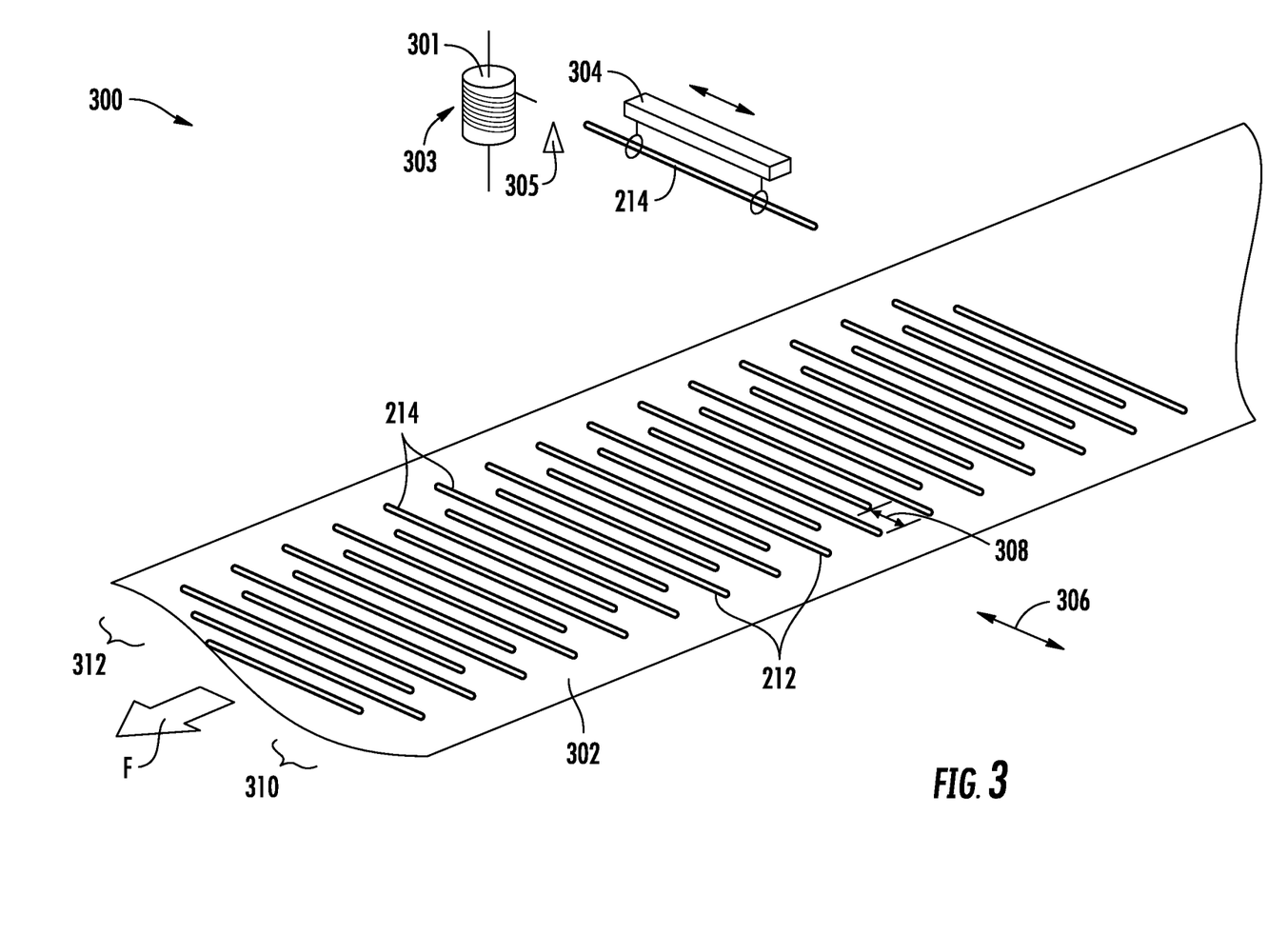
FIG. 3 shows a perspective view of a device for producing the component from FIG. 2 in a first state.
Figure 4:
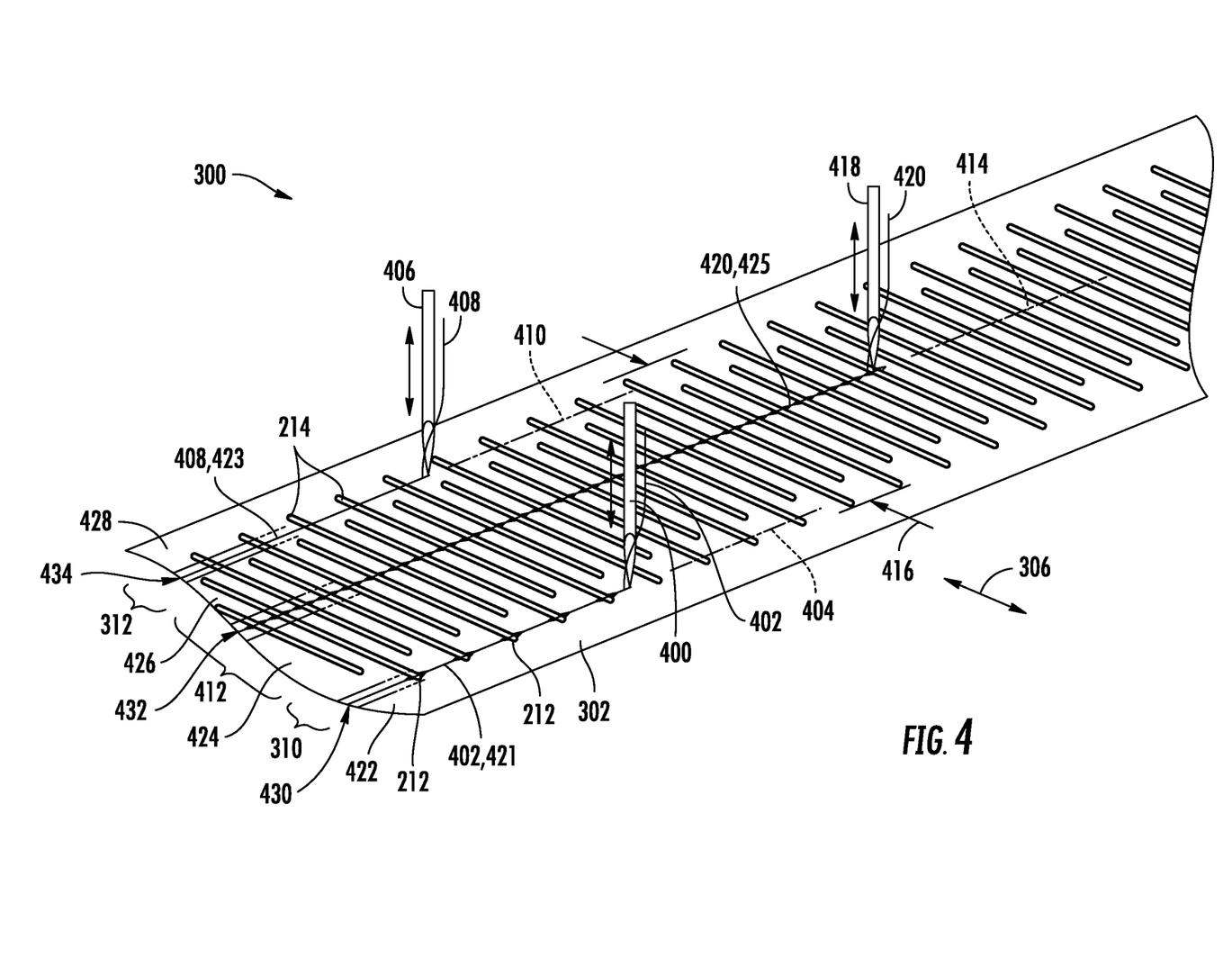
FIG. 4 shows the view from FIG. 3 in a second state of the device.
Figure 5:
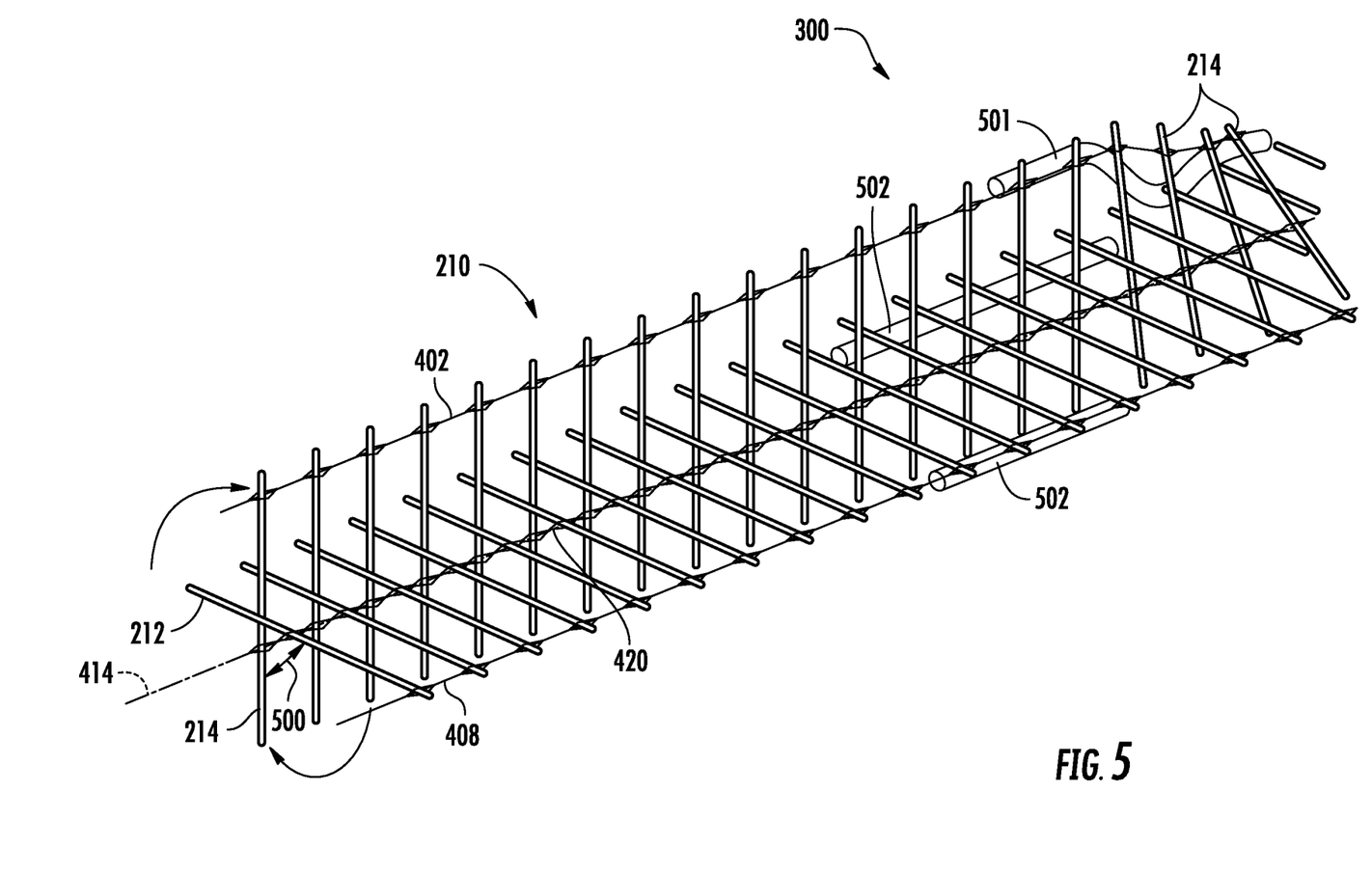
FIG. 5 shows the view from FIG. 4 in a third state of the device.

FIG. 3 to 5 show a plurality of states when producing the component 210 from FIG. 2 by a stitching method. Furthermore, FIG. 3 to 5 show various components of a device 300 for carrying out the method.

First and second fibres 212, 214 are deposited parallel to one another on a conveyor belt 302, moving in the conveying direction F, of the device 300, see FIG. 3. A respective fibre 212, 214 is preferably configured as a "fibre tow" of individual fibres. The designations 2k to 24k are, for example, prevalent here. A respective fibre 212, 214 is preferably deposited dry, i.e. without a thermoplastic or thermosetting matrix, although a depositing of wet fibres 212, 214 is in no way ruled out.

The device 300 furthermore comprises a reel 301 with continuous material 303, a cutting mechanism 305 and a depositing mechanism 304. The fibres 212, 214 are cut to length from the continuous material 303 by means of the cutting mechanism 305 and thereafter deposited on the conveyor belt 302 by means of the depositing mechanism 304, in particular a robot.

The fibres 212, 214 preferably in each case have the same length and, after depositing, extend in the direction 306 transverse to the conveying direction F.

The transverse direction 306 therefore corresponds to the longitudinal direction of the fibres 212, 214. The deposited fibres 212, 214 in each case have an offset 308 in the transverse direction 306 with respect to one another. This produces a first and second projection region 310, 312. The first projection region 310 only has ends of the first fibres 212 and the second projection region 312 only has ends of the second fibres 214.

FIG. 4 shows how the ends of the first fibres 212 are stitched together in the projection region 310. A corresponding connecting mechanism of the device 300 comprises a needle 400 and a stitching fibre 402. The stitching takes place, for example, along a line 404. Moreover, the ends of the second fibres 214 are stitched together in the second projection region 312. A corresponding connecting mechanism of the device 300 comprises a needle 406 and a stitching fibre 408. The stitching takes place, for example, along a line 410.

Between the two projection regions 310, 312, the first and second fibres 212, 214 form an overlap region 412, in which they overlap in the transverse direction 306. The first and second fibres 212, 214 are stitched together in the overlap region 412, in particular along a centre line 414. The centre line 414 is arranged centrally in relation to a total extent 416 of the fibres 212, 214 in the transverse direction 306. A corresponding connecting mechanism in the form of a needle and a stitching fibre is designated by the reference numerals 418 and 420. The lines 404, 410, 414 are preferably parallel to one another.

The movement of the needles 400, 406, 418 is indicated in each case by a double arrow. A respective upper stitching fibre 402, 408, 420 ("top thread") is preferably connected to a corresponding lower stitching fibre 421, 423, 425 ("bottom thread"). For this purpose, the conveyor belt 302 is preferably formed from a plurality of parts 422, 424, 426, 428, which form gaps 430, 432, 434 between them, through which a respective lower stitching thread 421, 423, 425 can easily be fed.

After this, the second fibres 214 are pivoted relative to the first fibres 212 about the centre line 414, i.e. about the stitching fibre 420, as indicated by the arrows in FIG. 5. A respective first fibre 212 then preferably forms, with a respective second fibre 214, an angle 500 of 90 degrees. A component 210 is therefore formed, which thereafter is integrated in the crossing region 236 of the structural arrangement 200, see FIG. 2, in particular as described above. The pivoting takes place, for example, by means of a pivoting mechanism of the device 300 in the form of a curved guide rail 501, which gradually rotates the second fibres 214 relative to the first fibres 212. The first fibres 212 may, for example, be moved onwards supported on horizontal guide rails 502 of the device 300, while the second fibres 214 pivot. The guide rails 500, 502 are only shown partially for the sake of greater clarity. For rotation, the first and second fibres 212, 214 can be lifted from the conveyor belt 302, which is why this is not shown in FIG. 5.

Instead of stitching, the first and second fibres 212, 214 can be woven or braided together by means of fibres 402, 408, 420.

Figure 6:
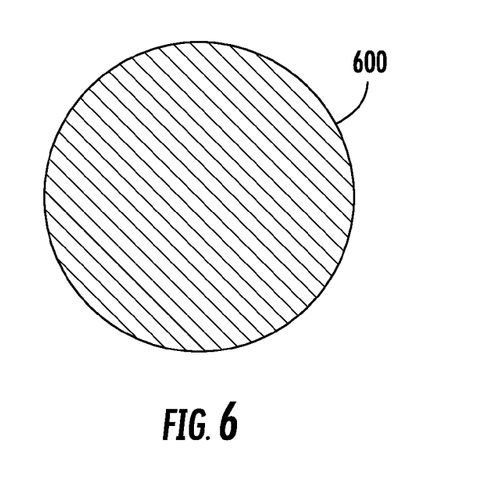
FIG. 6 shows a section through a thermoplastic strand.
Figure 7:
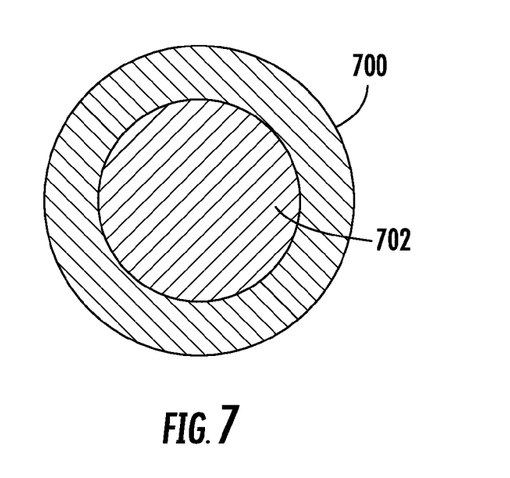
FIG. 7 shows a section through a fibre sheathed with a thermoplastic material.
Figure 8:
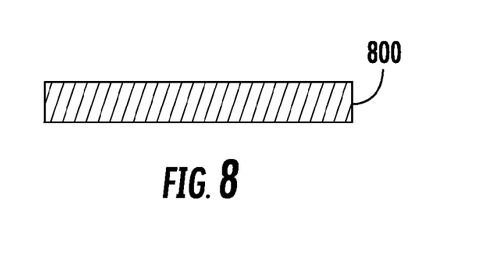
FIG. 8 shows a section through an adhesive strip.

The first and second fibres 212, 214 can furthermore alternatively be glued to one another, in particular by means of a thermoplastic strand 600 (see FIG. 6), a fibre 702 sheathed with thermoplastic material 700 (see FIG. 7) or an adhesive strip 800 (see FIG. 8). FIG. 6 to 8 show a cross-sectional view, in each case.

In an embodiment which is not shown, a first thermoplastic strand, a first sheathed fibre or a first adhesive strip extends along the first line 404 and connects the first fibres 212. A second thermoplastic strand, a second sheathed fibre or a second adhesive strip extends, for example, along the second line 410 and connects the second fibres 214. A third thermoplastic strand, a third sheathed fibre or a third adhesive strip extends, for example, along the centre line 414 and connects the first and second fibres 212, 214 to one another.

Although the invention was described in the present case with the aid of preferred embodiments, it is not in any way restricted thereto, but can be modified in diverse ways. In particular, the embodiments and configurations described for the methods according to the invention can be applied accordingly to the device according to the invention, and vice versa. Furthermore, "a" does not rule out a plural in the present case.

What is claimed is:

1. A method for producing a component for connecting structures at crossing regions thereof, the method comprising:
    depositing first fibres and second fibres on an underlay, wherein the first fibres and the second fibres are deposited in a direction transverse to a longitudinal direction of the underlay and in parallel to each other, such that each respective first fibre has an offset in the longitudinal direction of the first fibres or the second fibres with respect to each respective second fibre producing a first and second projection region, wherein the first projection region only has ends of the first fibres and the second projection region only has ends of the second fibres;
    connecting the first fibres and the second fibres along a region between the first and second projection regions; and
    pivoting the first fibres and the second fibres with respect to one another to form the component.

2. The method according to claim 1, wherein the first fibres are connected to one another in the first projection region, in which they project in the longitudinal direction over the second fibres, and/or the second fibres are connected to one another in the second projection region, in which they project in the longitudinal direction over the first fibres.

3. The method according to claim 1, wherein the first fibres and the second fibres are connected to one another in the overlap region along a centre line, which is arranged centrally in relation to a total extent of the first fibres and the second fibres in the longitudinal direction, and/or the first fibres are connected to one another in the first projection region along a first line parallel to the centre line and/or the second fibres are connected to one another along a second line parallel to the centre line and opposing the first line in relation to the centre line.

4. The method according to claim 1, wherein the first fibres and the second fibres are connected to one another in the overlap region, the first fibres are connected to one another in the first projection region and/or the second fibres are connected to one another in the second projection region by stitching, weaving, braiding or gluing.

5. The method according to claim 4, wherein at least one stitching, weaving or braiding fibre is fed through a gap in the underlay.

6. The method according to claim 4, wherein the gluing takes place by a thermoplastic strand, a fibre sheathed at least in portions with a thermoplastic material, or an adhesive strip.

7. The method according to claim 1, wherein the first fibres and the second fibres are pivoted with respect to one another in such a way that they have an angle of 30 to 90 degrees with respect to one another, and/or the pivoting of the first fibres and the second fibres with respect to one another is brought about by a curved guide element, past which the first fibres and/or the second fibres are guided.

8. The method according to claim 1, wherein the underlay is configured as a conveyor belt, on which the first and second fibres are deposited.

9. The method according to claim 1, wherein the first fibres and the second fibres are in each case cut to length from continuous material before being deposited.

10. A method for producing a structural arrangement for an aircraft or spacecraft, the method comprising:
    providing a first structure;
    providing a second structure, which forms a crossing region with the first structure;
    producing a component by a method according to claim 1; and
    connecting the first and second structure at the crossing region by the component.

* * * * *